United States Patent [19]

Arzberger et al.

[11] 4,015,749
[45] Apr. 5, 1977

[54] HOT COFFEE DISPENSER

[75] Inventors: William A. Arzberger, Medfield; Edward J. Lalumiere, Woburn, both of Mass.

[73] Assignee: Jet Spray Cooler, Inc., Waltham, Mass.

[22] Filed: Apr. 3, 1975

[21] Appl. No.: 564,772

Related U.S. Application Data

[63] Continuation-in-part of Ser. No. 464,220, April 25, 1974, abandoned.

[52] U.S. Cl. .............................. 222/70; 222/129.4; 222/146 HE
[51] Int. Cl.² .......................................... B67D 5/30
[58] Field of Search ............ 222/129, 129.1, 129.2, 222/129.3, 129.4, 135, 145, 146 HE, 146 R, 412, 70; 98/45, 46; 123/122 B, 122 F; 302/50, 52

[56] References Cited
UNITED STATES PATENTS

| 3,084,613 | 4/1963 | Maxson | 222/146 HE |
| 3,385,569 | 5/1968 | Bookout | 222/129.4 X |
| 3,554,609 | 1/1971 | Rollins | 302/52 |
| 3,568,887 | 3/1971 | Jacobs et al. | 222/70 |
| 3,616,968 | 11/1971 | James et al. | 222/70 |
| 3,790,028 | 2/1974 | Gardner | 222/129.4 |
| 3,822,810 | 7/1974 | Fuqua | 222/146 HE |
| 3,900,136 | 8/1975 | Paranto | 222/70 |

Primary Examiner—Robert B. Reeves
Assistant Examiner—John P. Shannon
Attorney, Agent, or Firm—Wolf, Greenfield & Sacks

[57] ABSTRACT

A coffee machine for dispensing automatically individual cup portions and pot size portions of coffee, as well as dispensing continuous flow of coffee and continuous flow of hot water comprising a housing with a hot water tank, a freeze-dried coffee concentrate hopper, and a mixing assembly for receiving the hot water and concentrate. A heating device is associated with the discharge passage from the hopper to prevent caking of the particles at the outlet, which would interfere with the proper metering of the coffee concentrate.

15 Claims, 5 Drawing Figures

HOT COFFEE DISPENSER

PRIOR RELATED APPLICATION

This application is a continuation-in-part of our prior application Ser. No. 464,220 filed Apr. 25, 1974, now abandoned.

INTRODUCTION

This invention relates to the dispensing of hot beverages and more particularly comprises a new and improved coffee dispenser that utilizes freeze-dried coffee as the flavor concentrate.

There are at the present time a number of coffee dispensers on the market, and the present invention comprises an improvement over those dispensers. One object of this invention is to provide a dispensing machine designed to dispense individual cups of coffee and which in addition has the capacity to and capability of filling large coffee pots either manually or automatically, and in addition can dispense clear hot water for use to make other hot beverages and soups. In order to perform these functions, the unit is provided with a relatively large hot water tank having the storage capacity to fill two 10-cup pots drawn in succession, without any noticeable decrease in coffee temperature. Furthermore, the configuration of the dispenser is such that a large pot may be placed beneath the discharge spout and rest on the dispenser drip tray or on the table or counter which supports the dispenser, and yet the spout itself is so designed that the coffee may be discharged into a cup on the same tray or support without splashing or otherwise splattering the hot beverage. At least one manufacturer at the present time offers the trade two separate dispensers, one intended to be used for filling coffee pots and the other intended to dispense single cups of coffee. The economic and space advantages of the present invention over such an arrangement are obvious.

Another object of the present invention is to provide a coffee dispenser which allows the user to draw clear hot water immediately after a cup of coffee has been drawn from the machine. In ceratin of the prior art devices, this result is achieved by separate controls for the hot water and flavoring, and the control for the water is programmed to run for a slight period following shut off of the flavoring. The separate controls normally employ separate timers, and while the separate timers allow for strength adjustment, they interfere with combining the controlled single cup dispensing and the continuous flow feature which permits the filling of a coffee pot, or odd size containers.

Yet another object of this invention is to provide a coffee dispenser which uses freeze-dried coffee and has an anti-caking facility. Freeze-dried coffee is very hygroscopic and has a tendency to cake up at the outlet. This interferes with accurate metering of the coffee powder. In certain prior art devices, heat is passed over the outlet in the form of a column of warm air. These devices are only partially satisfactory, as the large quantities of steam which rise around the outlet when a drink is dispensed has a tendency to cause condensation to form at the coffee outlet, which forms coffee crystals at that region.

To accomplish these and other objects, the preferred form of dispenser of this invention has a full one-gallon hot water tank mounted in its housing with sufficient immersion heaters to elevate the temperature of the water to the desired level and to maintain the temperature at that level even when the water is drawn on a continuous basis. The 1-gallon capacity will allow two 10-cup pots to be filled in succession, and the higher heating capacity assures rapid recovery of the water temperature. The electrical system for the dispenser includes an individual portion control which is adjustable from 5 to 9 ounces of coffee, a pot portion control which is adjustable for ordinary coffee pots of 54 ounces and odd size pots of coffee, a continuous flow circuit which allows uninterrupted discharge of coffee from the dispenser until the switch for that circuit is released, and a continuous flow hot water circuit which allows clear hot water to be drawn on a continuous basis. An another feature, the circuit includes a braked gear motor for the freeze-dried coffee dispenser so as to cause the auger which dispenses the coffee powder to stop immediately upon deactivation of the motor circuit. Further, the water is dispensed from the tank into the assembly for mixing the powder and water so as to create a standing vortex of water, into which the coffee powder is discharged. Further, the mixing assembly has a discharge spout having a positive slope to assure complete drainage of the coffee from the dispenser. The outlet spout itself is high enough on the dispenser housing to enable a coffee pot or decanter to be placed beneath the spout. At the same time, the discharge passage is so designed that the coffee will not splash when it discharges into a low profile cup, perhaps 2 or 3 inches high, several inches beneath the spout, when a single serving of coffee is being dispensed.

As yet another feature of this invention, the dispenser includes an anti-caking heated outlet plug which defines the discharge passage from the coffee concentrate hopper. Heat is directed over the plug, and the plug acts as a thermal fly wheel storing heat in the metal which protects the coffee outlet from condensation created by the rising steam from the coffee.

These and other objects and features of this invention will be better understood and appreciated from the following detailed description of one embodiment thereof selected for purposes of illustration and shown in the accompanying drawing, in which:

BRIEF FIGURE DESCRIPTION

DETAILED DESCRIPTION

Figure 1:
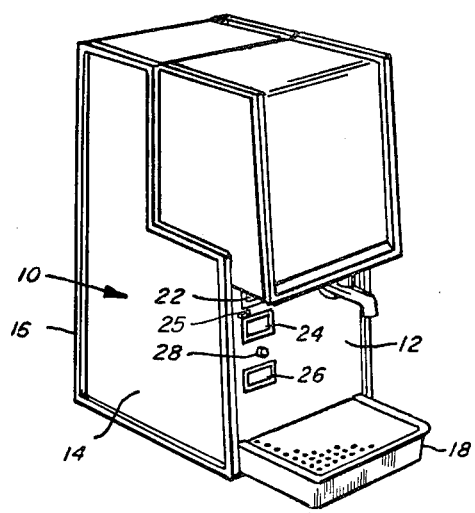
FIG. 1 is a perspective view on a reduced scale of a coffee dispenser embodying this invention.
Figure 2:
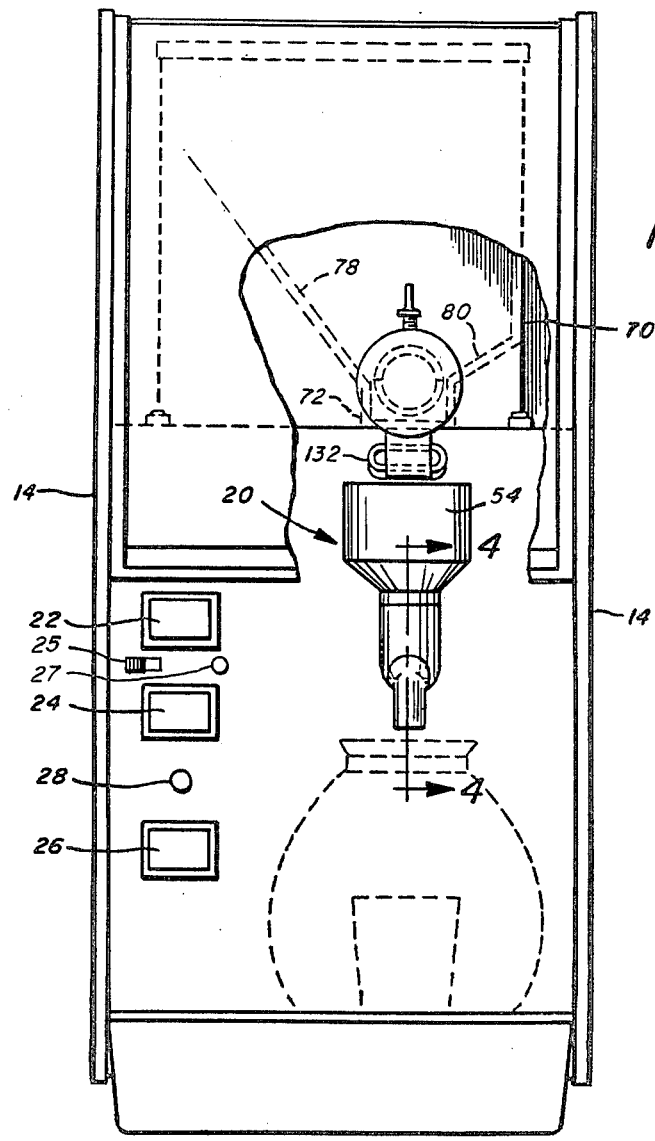
FIG. 2 is a front view of the dispenser of FIG. 1, with a portion of the housing broken away.

The dispenser shown in the drawing is contained in housing 10 having a front panel 12, side panels 14 and rear panel 16. A drip tray 18 is mounted on the bottom of the front panel 12 and is designed to support either a cup or pot to be filled by the dispenser. A mixing assembly and discharge spout 20 is also mounted on the front panel 12. The bottom of spout 20 is spaced from the drip tray 18 a distance sufficient to allow a 7½ inch coffee pot to be placed on the tray. Three main control buttons, 22, 24 and 26 are also mounted on front panel 12 along one side thereof, and their respective circuits produce continuous coffee flow, continuous hot water flow, and single portion and pot portion flow of coffee from the machine. A selector switch 25 for selecting either manual filling (continuous coffee flow) or automatic pot filling and a pot fill indicator light 27 are mounted on panel 12 beneath button 22. And an on-off light 28 is also present on panel 12 to indicate whether the machine is operative.

Figure 3:
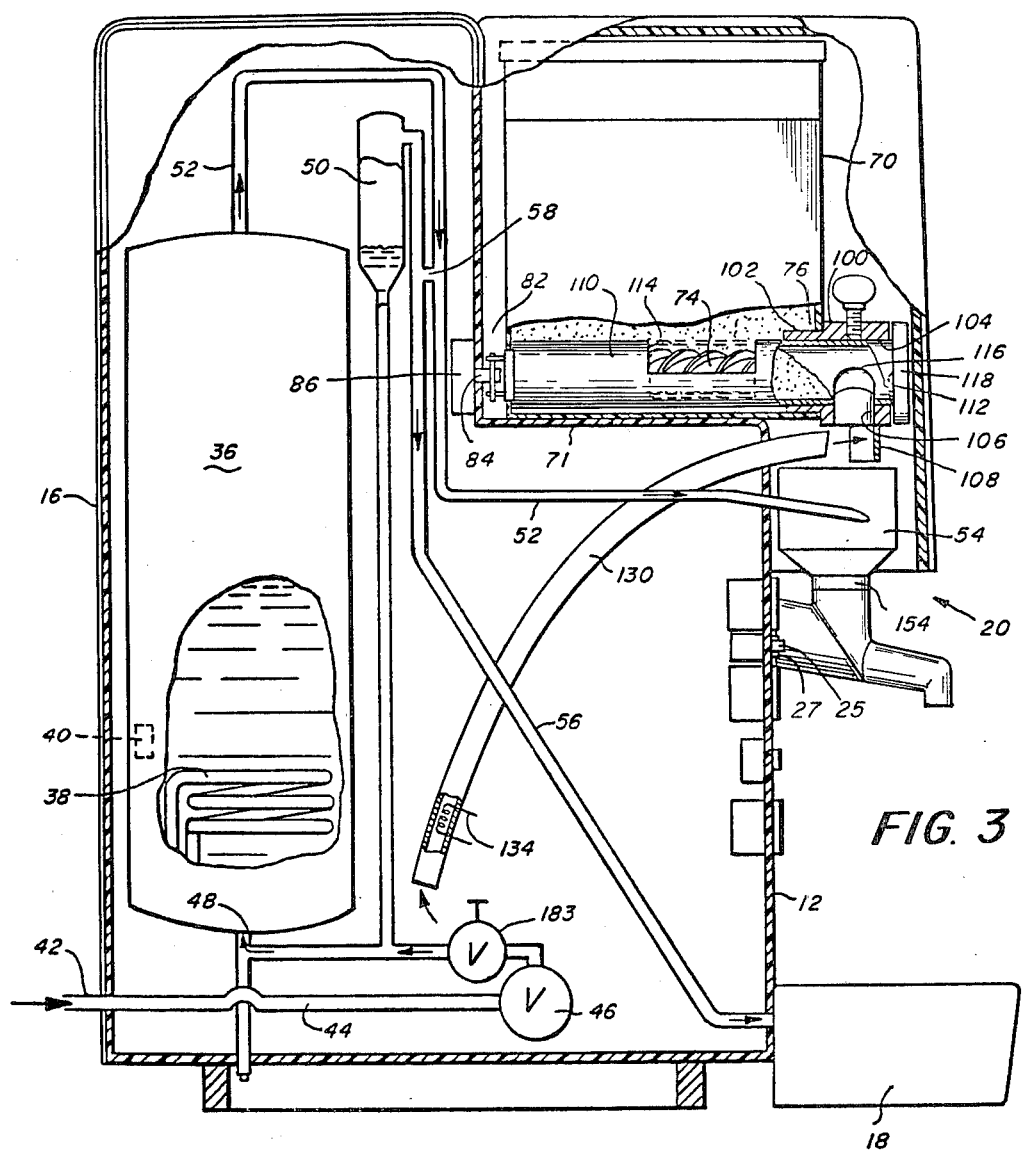
FIG. 3 is a side view of the dispenser with a portion of the housing broken away, and with certain parts of the interior of the dispenser shown diagrammatically.
Figure 4:
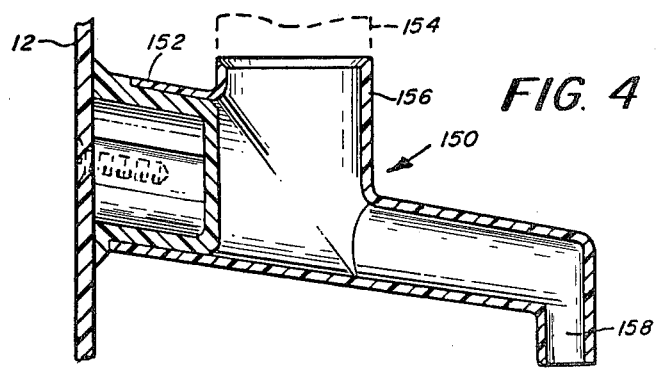
FIG. 4 is an enlarged cross sectional view taken on section line 4—4 of FIG. 2.

The dispenser has separate hot water and coffee concentrate supplies. Both of these are shown in FIG. 3. The hot water supply includes a heating tank 36 preferably holding a gallon or more of water, within which are immersed heating coils 38. A thermostat 40 is also present, which controls the water temperature. Hot water tank 36 is supplied by water through a system of ducts which are represented schematically. The system is described and shown in detail in U.S. Pat. No. 3,737,076 dated June 5, 1973 and assigned to Jet Spray Cooler, Inc., the assignee of the instant application. Briefly, the duct system includes a fitting 42 which may be connected to a constant pressure water line, located on back panel 16 coupled to duct 44 interrupted by solenoid valve 46, which feeds water into the bottom of the tank 36 as suggested at 48. An expansion reservoir 50 is connected to duct 44 between solenoid valve 46 and the inlet to the tank. Hot water is discharged from tank 36 through duct 52 connected to the top of the tank. Duct 52 exits through the front panel 12 of housing 10 and tangentially enters funnel 54 of the mixing assembly and discharge spout 20. An overflow and vent duct 56 is connected to the top of expansion chamber 50 and exits through the front panel 12 at drip tray 18. A bypass 58 connects the ducts 52 and 56 to allow for the flow of water in line 52 through vent duct 56.

The freeze-dried coffee concentrate is contained in rectangular hopper 70 supported on shelf 71 above front panel 12. The hopper is formed with a trough 72 in the bottom, which contains auger 74 used to propel the coffee concentrate through opening 76 in the front of hopper 70. The trough is defined in part by baffles 78 and 80 that converge toward the trough so as to cause the freeze-dried coffee in the hopper to flow in the direction of the trough into the path of the auger blades. The auger is driven through mechanical coupling 82 connecting the rear of the auger and shaft 84 of braked gear motor 86.

Metal heat plug 100 has a rear section 102 of reduced diameter that fits within discharge opening 76 in hopper 70 and has a horizontal central bore 104 that forms a continuation of opening 76 for the discharge of freeze-dried coffee from the hopper. An outlet passage 106 intercepts bore 104 through which the freeze-dried coffee moves upon discharge from the hopper. A deflector 108 depends from plug 100 adjacent the forward edge of passage 106 to prevent the coffee dust from spreading about the hopper area during use. A metering device in the form of a sleeve 110 is disposed in bore 104 and extends through opening 76 into trough 72 in the bottom of the hopper. The forward end 112 of the sleeve is closed to prevent the coffee concentrate from discharging through the front of plug 100. The inner end of sleeve 110 surrounds the auger in trough 72, and an opening 114 in the sleeve enables coffee in the hopper to fall into contact with the auger blade to allow the auger to push the coffee towards discharge passage 106. A large circumferential slot 116 is formed in the sleeve 110 in alignment with discharge passage 106 so as to permit coffee in the sleeve to discharge through passage 106 regardless of the circumferential position of sleeve 110. A control knob 118 on the front of sleeve 110 beyond the front of plug 100 facilitates turning of sleeve 110 in the plug. It is evident that the amount of coffee which enters the auger interior during a given time period may be altered by altering the circumferential position of opening 114. When the opening is in the uppermost position, maximum flow of coffee concentrate is permitted from the hopper into sleeve 110, while the amount may be diminished to a point where no coffee enters the sleeve when the opening 114 is oriented in a downwardly facing direction.

The metal heat plug 100 is made of a good conducting material such as aluminum and is designed to be heated to approximately 240° F. by hot air discharging from heat tube 130. In FIG. 3 it will be noted that heat tube 130 extends from the vicinity of the bottom of housing 10 upwardly in a generally curved direction to a point where it exits through the top of front panel 12, and the upper outer outlet 132 of heat tube 130 is disposed immediately adjacent plug 100. A heater 134 is mounted in the heat tube adjacent its bottom so as to heat air in the tube. The heater creates a natural draft in the heat tube causing air at a highly elevated temperature to discharge from outlet 132. The temperature of the air leaving the tube at the outlet may be in the range of 225° to 250° F. The heated plug 100 acts as an anticaking device by preventing the freeze-dried coffee which is highly hygroscopic from absorbing water and thereby plugging the sleeve 110 and outlet passage 106. The heated plug acts essentially as a thermal fly wheel and stores heat in the metal which protects the coffee from condensation caused by rising steam from mixing assembly 20.

The mixing assembly and discharge spout 20 includes the funnel section 54 into which the water is discharged tangentially so as to create a standing vortex therein when the machine is in operation. The freeze-dried coffee in turn is dumped from the passage 106 into the center of the vortex, and the water prevents any powder concentrate from adhering to the walls of the funnel. The hopper is connected to the top of spout 150 mounted on front panel 12 of housing 10 by means of the support 152. The lower end 154 of funnel 54 fits within the spout collar 156 so that all of the water in the funnel, with or without coffee concentrate, flows into the spout. The spout, as is evident in the drawing has a positive slope so as to cause all liquid in it to flow toward the downturned discharge port 158. Therefore, no liquid can collect in the spout so as to mix with liquid later discharged by the dispenser.

Figure 5:
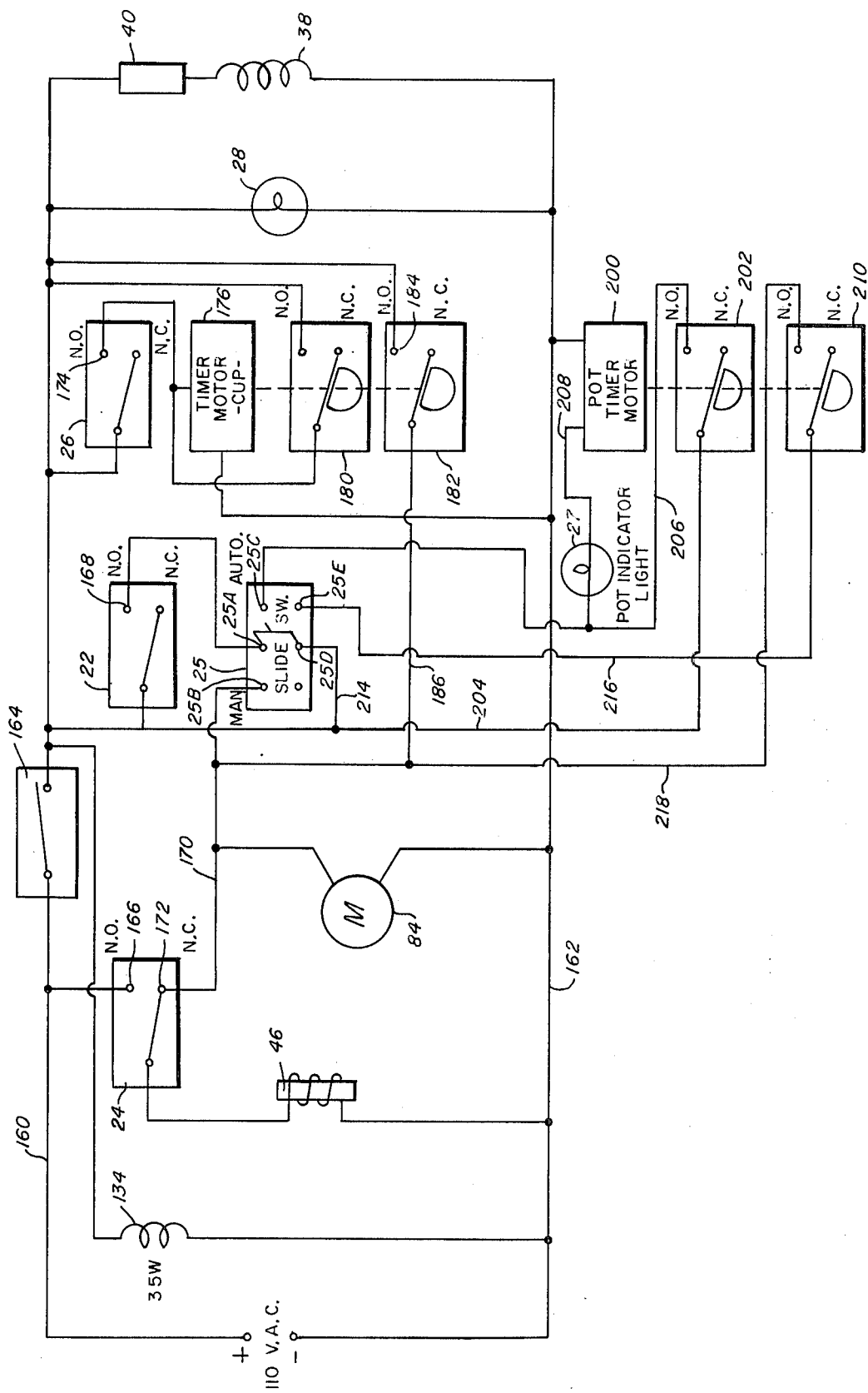
FIG. 5 is a schematic diagram of the control circuit of the dispenser of this invention.

In FIG. 5 the control circuit for the solenoid 46, braked gear motor 84, and immersion heater 38 is shown along with the several actuating switches that determine whether the machine dispenses a single serving of coffee, a pot size portion of coffee, a continuous flow of coffee for filling odd size coffee containers, or a continuous flow of hot water. The control circuit is shown drawn schematically between lines 160 and 162, and a main switch 164 is shown in line 160, which controls all of the circuits but that containing the hot water switch 24. The various functions of the dispenser are operated by the control circuit as follows: When the main on-off switch 164 is closed, heater 134 in heat pipe 130 is energized, pilot light 28 is lighted, and immersion heater 38 in circuit with thermostat 40 is also energized. Consequently, hot water is produced in tank 36, and hot air is emitted from the discharge end 132 of heat tube 130.

To draw hot water from the dispenser, the operator merely presses single throw switch 24 so as to close the normally open contact 166 and the circuit for solenoid valve 46 is completed causing it to open and allow water to flow through duct 44 into the bottom of the tank 36 which in turn displaces water from the tank top out duct 52. So long as the switch 24 is depressed, hot water will flow through duct 52 into the funnel 54 and out discharge spout 150. It will be appreciated that the circuit for the braked gear motor 84 is not effected by the closing of normally open contact 166, and the motor remains inactive.

To draw a continuous flow of coffee from the dispenser, the double pole-double throw selector switch 25 is placed in the "manual" position connecting contacts 25A and 25B in the switch, and push button switch 22 is depressed so as to close its normally open contact 168. When that is done, the circuit for gear motor 84 is completed through switches 22 and 25 so as to energize the motor to rotate auger 74. Simultaneously, the solenoid valve 46 is opened by its energization through switches 22 and 25, lead 170, and normally closed contact 172 of switch 24. The simultaneous energization of motor 84 and solenoid 46 causes both water to tangentially enter the funnel 54 of assembly 20 and coffee to be dispensed by auger 74 through metal heat plug 100 and discharge passage 106. As described above, the coffee particles are discharged into the center of the standing vortex of water in the funnel, and therefore no powder collects on the funnel walls. And coffee may be dispensed in this fashion so long as push button switch 22 is depressed.

To dispense a single serving of coffee, the operator only need momentarily depress manual switch 26 to close its normally opened contact 174. That action instantaneously energizes timer motor 176. When the timer motor turns a few degrees, cam switch 180 closes to complete a running circuit for the timer motor. Cam switch 180 closes for a prescribed duration of approximately 8 seconds and consequently maintains the motor operation for that period. Motor 176 also operates an adjustable cam switch 182 which may be set for a period of from 5 to 9 seconds, depending upon how large the single serving is to be. As the machine dispenses approximately 1 ounce per second, a 5 ounce cup of coffee would require a setting of cam 182 for a period of 5 seconds. With cam switch 182 closed (switch making contact with normally open contact 184) the circuit for the gear motor 84 and solenoid valve 46 is completed through leads 186 and 170. Thus, with the adjustable cam switch 182 set for a prescribed duration, in order to dispense a single serving of coffee the operator only momentarily depresses push button switch 26. The timer motor will run for the cycle prescribed by fixed cam switch 180, and the actual brake gear motor 184 and solenoid valve 46 will be energized for a duration dictated by adjustable cam switch 182.

To automatically dispense a pot full of coffee, the selector switch 25 is thrown to the "automatic" position connecting contacts 25A with 25C and 25D with 25E and the operator momentarily depresses push button switch 22. That action energizes pot timer motor 200, (and pot indicator light 27) which closes cam switch 202. Cam switch 202 closes the motor running circuit through leads 204 and 206, light 27 and lead 208. Consequently, it is unnecessary to continue to depress switch 22. Rotation of pot timer motor 200 also closes the adjustable timer switch 210. So long as switch 210 is closed, the motor 84 and solenoid 46 are energized through the circuit which includes leads 204 and 214, contacts 25D and 25E of switch 25, lead 216, cam switch 210, leads 218 and 170 and normally closed contact 172 of switch 24. The adjustable cam switch 210 is ordinarily preset to maintain motor 84 operating and solenoid valve 46 open for a period to dispense 54 ounces of coffee. The cam switch can be adjusted for other settings to fill odd size pots.

If the operator wishes to discontinue automatic filling of the pot for any reason, he need only throw the selector switch 25 to the manual position. That will cause motor 84 to stop and valve 46 to open. The pot timer motor, however, will continue to run and indicator light 27 will continue to glow by virtue of the continued closing of motor running circuit through cam switch 202. Additional full pots of coffee cannot be automatically dispensed until the light 27 goes out.

From the foregoing description those skilled in the art will appreciate the many advantages derived from the coffee dispensing machine of this invention. For example, beacuse of the large tank, the machine can dispense enough coffee to fill two 10-cup pots. And because of the location of the discharge spout with respect to the drip tray, a pot may be placed beneath the discharge spout for easy filling. At the same time, because of the small streamlined configuration of the discharge end 158 of the spout 150, the coffee will not splash even when it flows directly into a small cup on the drip tray several inches beneath the spout. The control circuit allows for the use of a single timer cam for both coffee and hot water (either cam 182 or 210) in either the automatic cup filling or pot filling cycle. Both the motor 84 and solenoid valve 46 are controlled by the same adjustable timer in either cycle and thus the size of a drink may be varied by extending or reducing the time cycle while the coffee-water ratio remains unchanged. Nevertheless, the coffee-water ratio can be changed in any one of several different ways. For example, the throw of powder by the auger can be modified by rotating the sleeve. Alternatively, the auger itself may be changed to provide an auger blade of different pitch so as to increase or decrease the auger throw. In addition the water flow rate can be varied independently from the timer by manually adjustable flow control 183 thus allowing additional strength or portion adjustment.

In order to assure that clear water is discharged by the dispenser upon actuation of hot water button 24, the braked gear motor is used, which instantaneously stops when its energizing circuit is open. There is no coasting of the motor, which would cause additional powder to be discharged following deenergization of the circuit. Further, the vortex created by the tangential entry of water into the funnel of the mixing assembly holds the water above the area where the coffee falls into the funnel so that any coffee which falls into the funnel is constantly rinsed from it. Therefore the sides of the funnel are left clean as the water level drops after the solenoid is closed. And the mixing chamber within the discharge spout has a positive slope to assure complete drainage of the coffee product.

The metal heat plug at the outlet of the coffee hopper prevents any caking of the coffee. The stored heat in the plug protects the coffee outlet for condensation which tends to accumulate from the rising steam. And the solid, small diameter outlet stream of the discharge spout limits the amount of steam which can actually rise in the adjacent areas. The deflector also helps relieve the problem by limiting the travel of coffee dust in the region of the discharge spout.

Those skilled in the art will appreciate that numerous modifications may be made of this invention without departing from its spirit. Therefore, we do not intend to limit the scope of this invention to the single embodiment illustrated and described. Rather, it is intended that the scope of this invention be determined by the appended claims and their equivalents.

What is claimed is:

1. A coffee dispensing machine comprising:
a housing and a hot water tank in said housing,
a hopper assembly comprising a hopper for containing powder coffee concentrate on said housing,
an outlet passage in the bottom portion of said hopper assembly for discharging selected amounts of powder coffee from said hopper,
a mixing assembly mounted on said housing adjacent said outlet passage and positioned to receive both powder discharged through said passage and water from the tank,
a heat conducting block formed of good heat conducting material and surrounding said outlet passage and when heated maintaining the outlet passage and region in the hopper assembly adjacent the passage hot and dry,
a heat tube having a discharge end disposed adjacent the outlet passage,
heating means in the housing causing heated air to flow through the tube to its discharge end to heat said block and outlet passage,
a deflector connected to the block immediately adjacent the outlet passage,
said heating means being operatively associated with the block for heating the block and passing a stream of heated air to said block in a direction toward said deflector whereby said deflector prevents powder discharged through the passage from flying around the discharge region,
and said outlet passage being formed in said block.

2. A coffee dispensing machine as described in claim 1 further characterized by
said hopper assembly including a container with side and bottom walls,
a trough formed along the bottom wall and inclined baffles on the bottom wall sloping toward the trough for causing powder coffee in the container to flow by gravity into the trough,
an auger in the trough for propelling powder therein toward one end,
and an opening in the container at the end of the trough through which the powder can be propelled by the auger,
said block being connected to said opening with the outlet passage forming a continuation thereof,
said outlet passage having a vertical portion which directs the powder into the mixing assembly.

3. A coffee dispensing machine as described in claim 1 further characterized by
an auger in the hopper assembly for propelling powder toward said outlet passage,
a metering sleeve surrounding said auger for controlling the rate at which powder reaches the auger,
and said outlet passage having a vertical portion which directs the powder into the mixing assembly.

4. A coffee dispensing machine as described in claim 2 further characterized by
a sleeve surrounding said auger and extending from the trough into the outlet passage,
an opening in the sleeve through which powder in the container must pass to reach the auger,
and means connected to the sleeve for turning it in the trough to change the effective size of the opening for varying the rate at which the powder may reach the auger.

5. A coffee dispensing machine as described in claim 1 and further comprising
means including a motor for propelling the coffee powder from the hopper assembly into the outlet passage and mixing assembly,
means including a solenoid valve for controlling the flow of water from the tank to the mixing assembly,
and a control circuit in the housing for the motor and solenoid valve, said circuit having a first switch when manually operated opening the solenoid valve, a second switch when manually operated opening the solenoid and energizing the motor, and a third switch when actuated opening the valve and energizing the motor for a prescribed period to provide portion control for the dispenser.

6. A coffee dispensing machine as described in claim 5 further characterized by
means including yet another switch when actuated opening the valve and energizing the motor for a different prescribed period.

7. A coffee dispensing machine as described in claim 5 further characterized by
the prescribed period being sufficient to fill a single serving of coffee.

8. A coffee dispensing machine as described in claim 6 further characterized by
the first recited prescribed period being sufficient to fill a single serving of coffee and the different prescribed period being sufficient to fill a pot of coffee.

9. A coffee dispensing machine as described in claim 5 further characterized by
adjustable timer means in the circuit for varying the prescribed period.

10. A coffee dispensing machine as described in claim 5 further characterized by
said second and third switches when operated and actuated respectively causing the valve to be open and the motor to run simultaneously.

11. A coffee dispensing machine as described in claim 5 further characterized by
means operatively connected to said circuit for adjusting the prescribed period to vary the portion dispensed by the machine by actuation of the third switch.

12. A coffee dispensing machine as described in claim 5 further characterized by
said motor being a braked gear motor which stops so as to stop the throw of the coffee powder instantly upon deenergization of the motor.

13. A coffee dispensing machine as described in claim 21 further characterized by
said mixing assembly including a funnel-shaped inlet into which the water flows and the coffee powder is deposited from the outlet passage, a spout connected to the bottom of the funnel-shaped inlet for receiving the mixed water and coffee powder, said spout having an internal passage which is inclined from the horizontal and which terminates in a vertical portion so as to assure complete drainage of all liquid that flows into it from the funnel-shaped inlet.

14. A liquid food dispensing machine comprising:

a housing and a hot water tank in said housing, a hopper assembly comprising a hopper for containing powder food concentrate on said housing, an outlet passage in the bottom portion of said hopper assembly for discharging selected amounts of said powder from said hopper, a mixing assembly having no mechanically moving parts and being mounted on said housing adjacent said outlet passage and positioned to receive both powder discharged through said passage and water from the tank, said mixing assembly comprising a funnel section and means for maintaining a vortex of water in said section into which said powder drops and is mixed with said water, a heat conducting block formed of good heat conducting material and surrounding said outlet passage and when heated maintaining the outlet passage and region in the hopper assembly adjacent the passage hot and dry, a heat tube having a discharge end disposed adjacent the outlet passage, heating means in the housing causing heated air to flow through the tube to its discharge end to heat said block and outlet passage, a deflector connected to the block immediately adjacent the outlet passage, said heating means being operatively associated with the block for heating the block and passing a stream of heated air to said block in a direction toward said deflector whereby said deflector prevents powder discharged through the passage from flying around the discharge region, and said outlet passage being formed in said block.

15. A coffee dispensing machine comprising a housing and a hot water tank in said housing, a hopper assembly for containing powder coffee concentrate on said housing, an outlet passage in the bottom portion of said hopper assembly for discharging selected amounts of powder coffee from said hopper, a mixing assembly mounted on said housing below said outlet passage and positioned to receive both powder discharged through said passage and water from the tank, a trough in the bottom of the hopper assembly communicating with the outlet passage, an auger in the trough for moving powder in the hopper to the outlet passage, an adjustable sleeve metering device operatively associated with the trough for controlling the rate at which powder in the hopper assembly falls into the trough, said adjustable sleeve having means extending out of said trough for enabling hand adjustment of said device.

* * * * *